United States Patent [19]
Jo

[11] Patent Number: 6,123,014
[45] Date of Patent: Sep. 26, 2000

[54] DISASSEMBLABLE OVEN ROASTER

[75] Inventor: Jong-Yeon Jo, Kum-Ho Apt. #6-1302, 350 Sunhak-Dong, Yeonsu-Gu, 420-130 Inchon, Rep. of Korea

[73] Assignees: Jong-Yeon Jo, Incheon; Sang-Hun Park, Gyunggi-do, both of Rep. of Korea

[21] Appl. No.: 09/479,319

[22] Filed: Jan. 6, 2000

[30] Foreign Application Priority Data

Jun. 11, 1999 [KR] Rep. of Korea ..................... 99/21827

[51] Int. Cl.⁷ .............................. A47J 37/00; A47J 37/04; A47J 37/07
[52] U.S. Cl. ............................ 99/421 H; 99/419; 99/449; 99/476; 219/400
[58] Field of Search ................. 99/339–341, 419–421 V, 99/400, 401, 444–450, 481, 482, 476; 126/25 R, 9 R, 41 R, 25 AA; 219/400, 401, 403, 404, 386; 426/523, 466

[56] References Cited

U.S. PATENT DOCUMENTS

| | | | |
|---|---|---|---|
| 3,126,814 | 3/1964 | Brown | 99/421 H |
| 4,982,657 | 1/1991 | Ghenic | 99/419 X |
| 5,172,628 | 12/1992 | Pillsbury et al. | 99/421 A |
| 5,184,540 | 2/1993 | Riccio | 126/25 R |
| 5,361,686 | 11/1994 | Koopman | 99/446 X |
| 5,367,950 | 11/1994 | Sarich | 99/449 X |
| 5,421,318 | 6/1995 | Unruh et al. | 126/9 R |
| 5,485,780 | 1/1996 | Koether et al. | 219/400 X |
| 5,562,022 | 10/1996 | Schmid et al. | 99/419 X |
| 5,715,744 | 2/1998 | Coutant | 99/421 R |
| 5,799,569 | 9/1998 | Moreth | 99/446 X |
| 5,819,639 | 10/1998 | Spell | 99/419 X |
| 5,887,513 | 3/1999 | Fielding et al. | 99/421 H |

Primary Examiner—Timothy Simone
Attorney, Agent, or Firm—Sheridan Ross P.C.

[57] ABSTRACT

Disclosed is a disassemblable oven roaster. The disassemblable oven roaster comprises a geared motor having a main shaft to a free end of which a fan is mounted and a reduction shaft to a free end of which a roasting spit is connected; a motor housing for accommodating the geared motor; an intermediate supporting member detachably and horizontally coupled to the motor housing for supporting a roasting heater and the roasting spit which are disposed therein in a manner such that they are spaced apart from each other by a predetermined distance, the intermediate supporting member having opened upper and lower ends; and upper and lower oven elements covering the opened upper and lower ends, respectively, of the intermediate supporting member, the upper and lower oven elements being configured so that they can be separated from the intermediate supporting member.

3 Claims, 5 Drawing Sheets

DISASSEMBLABLE OVEN ROASTER

BACKGROUND OF THE INVENTION

1. Field of the Invention

The present invention generally relates to a disassemblable oven roaster, and more particularly, the present invention relates to a disassemblable oven roaster wherein upper and lower oven elements are separably coupled to an intermediate supporting member which supports a roasting spit connected to a reduction shaft of a motor, thereby to improve storability of the oven roaster, and a fan for circulating inside air is integrally fastened to a main shaft of the motor thereby to increase heating efficiency.

2. Description of the Related Art

Generally, an oven type electric roaster includes, as shown in FIG. 1, a motor housing 2 which accommodates a geared motor 1, and a roaster housing 3 which is integrally coupled to the motor housing 2. The geared motor 1 which is disposed in the motor housing 2, has a reduction shaft 1-4. The reduction shaft 1-4 provides output which is reduced through a gear section 1-3 connected to a main shaft 1-2 of a motor body 1—1. A roasting heater 4 which performs a roasting function and a roasting spit 5 which is fastened to the reduction shaft 1-4 of the geared motor 1, are integrally mounted to the roaster housing 3. The roasting spit 5 has a knob portion 5-1 which can be grasped by hand when roasting food material. The knob portion 5-1 projects out of the roaster housing 3. An openable and closable cover 6 is installed on an upper end of the roaster housing 3. The roasting heater 4 is located at a lower place in the roaster housing 3 in such a manner that it is opposite to the roasting spit 5.

When using the oven type electric roaster, the food material to be roasted, for example, meat as shown by a one-dot chain line in FIG. 2, is secured on the roasting spit 5 by means of a separate bent portion (not shown) which is formed at one end of the roasting spit 5 to secure the food material on the roasting spit 5, and one end of the roasting spit 5 is fastened to the reduction shaft 1-4, as shown in FIG. 2. Then, if a power control switch (not shown) is turned on, electric power is applied to the roasting heater 4, and thereby the roasting heater 4 is heated. At the same time as this, the geared motor 1 is driven and reduced output is outputted through the reduction shaft 1-4. Due to the fact that the reduction shaft 1-4 is coupled to the roasting spit 5, as the reduction shaft 1-4 of the geared motor 1 is rotated, the roasting spit 5 is rotated as well. In other words, the roasting spit 5 and the food material which is secured on the roasting spit 5, are integrally rotated with each other, and according to this, heat of the roasting heater 4 is radiated to the food material. Therefore, as time passes, the food material is gradually roasted from exterior toward interior.

However, the conventional oven type electric roaster constructed as mentioned above suffers from defects in that, since the heat is radiated only from the roasting heater 4, the heat cannot be transferred in a sufficient manner to a place which is adjacent to the cover 6, and a portion of the food material which comes adjacent to the cover 6 cannot be properly heated, whereby a great deal of heating time is required and heating efficiency is deteriorated.

SUMMARY OF THE INVENTION

Accordingly, the present invention has been made in an effort to solve the problems occurring in the related art, and an object of the present invention is to provide an oven roaster in which means for circulating heat is additionally arranged, thereby allowing a reduction in heating time of food material.

Another object of the present invention is to provide an oven roaster which is constructed in a manner such that it can be disassembled, thereby to enable easy storage thereof when not being used and easy assemblage thereof when being used.

In order to achieve the above objects, according to the present invention, a fan is fastened to a main shaft of a geared motor to circulate heat inside an oven roaster, a roasting spit for roasting food material is detachably and rotatably mounted to an intermediate supporting member, and upper and lower oven elements are coupled to upper and lower ends, respectively, of the intermediate supporting member in such a manner that they can be disassembled from the intermediate supporting member.

In a concrete way, according to one aspect of the present invention, there is provided a disassemblable oven roaster comprising: a geared motor having a main shaft to a free end of which a fan is mounted and a reduction shaft to a free end of which a roasting spit is connected; a motor housing for accommodating the geared motor; an intermediate supporting member detachably and horizontally coupled to the motor housing for supporting a roasting heater and the roasting spit which are disposed therein in a manner such that they are spaced apart from each other by a predetermined distance, the intermediate supporting member having opened upper and lower ends; and upper and lower oven elements covering the opened upper and lower ends, respectively, of the intermediate supporting member, the upper and lower oven elements being configured so that they can be separated from the intermediate supporting member.

According to another aspect of the present invention, the roasting heater has a pair of first bent portions which allow the roasting heater to extend perpendicularly to a bottom surface of the lower oven element and a pair of second bent portions which allow the roasting heater to extend adjacently and parallel to the bottom surface of the lower oven element.

According to still another aspect of the present invention, the roasting heater is supported by a support bar; and the support bar has a pair of third bent portions which are formed adjacent to both free ends, respectively, of the support bar in a manner such that both free ends of the support bar are supported by the intermediate supporting member and a pair of fourth bent portions which allow the support bar to extend parallel to the bottom surface of the lower oven element thereby to support the roasting beater.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
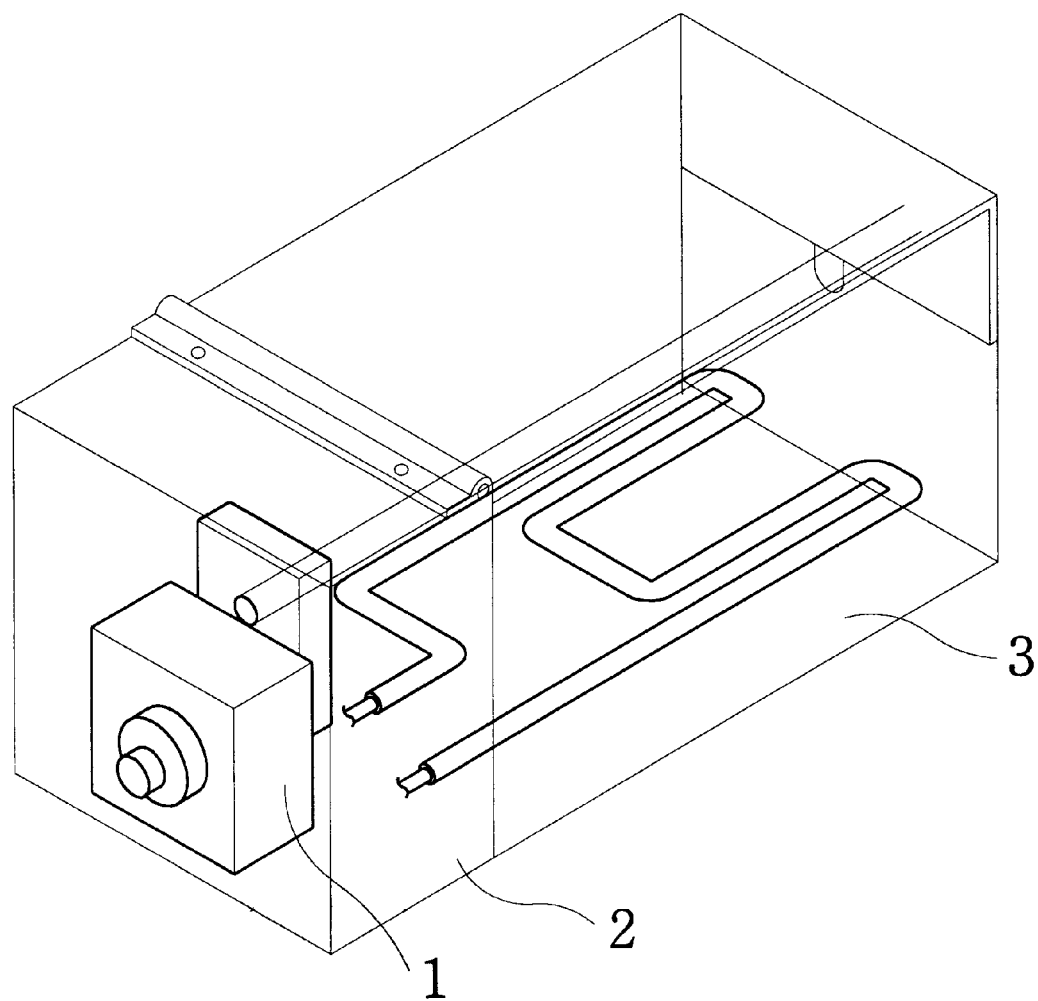
FIG. 1 is a perspective view illustrating a conventional oven roaster.
Figure 2:
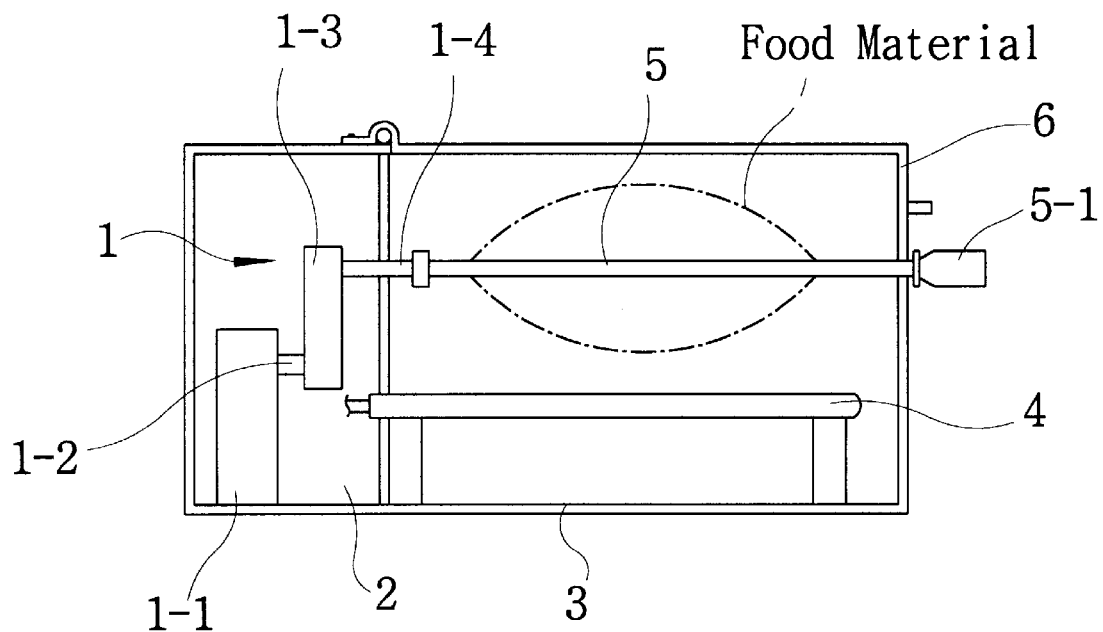
FIG. 2 is a longitudinal cross-sectional view of the oven roaster of FIG. 1.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
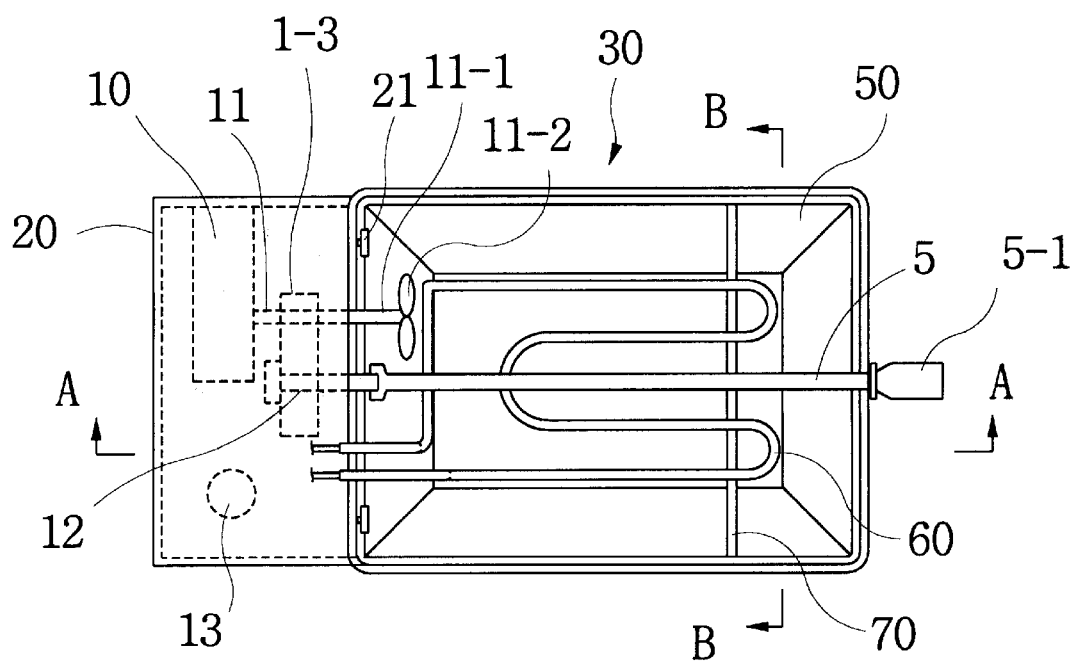
FIG. 3 is a plan view illustrating a disassemblable oven roaster in accordance with an embodiment of the present invention, with an upper oven element omitted.

FIG. 3 is a plan view illustrating a disassemblable oven roaster in accordance with an embodiment of the present invention, with an upper oven element omitted. According to the present invention, a motor housing 20 and an intermediate supporting member 30 are coupled to each other due to the fact that a plurality of engaging projections 21 which are formed on the motor housing 20 are inserted and fitted into a plurality of engaging holes 33, respectively, which are defined in the intermediate supporting member 30. A geared motor 10 which has a main shaft 11 and a reduction shaft 12, is mounted to the motor housing 20. Specifically, according to the present invention, an extended shaft portion 11-1 is additionally constructed by extending the main shaft 11 in a manner such that it passes through a reduction section 1-3 and projects out of the motor housing 20. A fan 11-2 is fastened to a free end of the extended shaft portion 11-1, and a roasting spit 5 is fastened to the reduction shaft 12. The main shaft 11 and the reduction shaft 12 are rotatably supported by the intermediate supporting member 30. A lower oven element 50 is coupled to a lower end of the intermediate supporting member 30. The roasting spit 5 is also rotatably supported by the intermediate supporting member 30. A roasting heater 60 is secured to the intermediate supporting member 30 due to the fact that both ends thereof are fitted into the intermediate supporting member 30 by means of a pair of connectors, respectively. In addition, a support bar 70 which supports the roasting heater 60, is fixed to the intermediate supporting member 30. A free end of the roasting spit 5 is formed as a knob portion 5-1 which projects out of the intermediate supporting member 30. The drawing reference numeral 13 represents a power control switch section.

Figure 4:
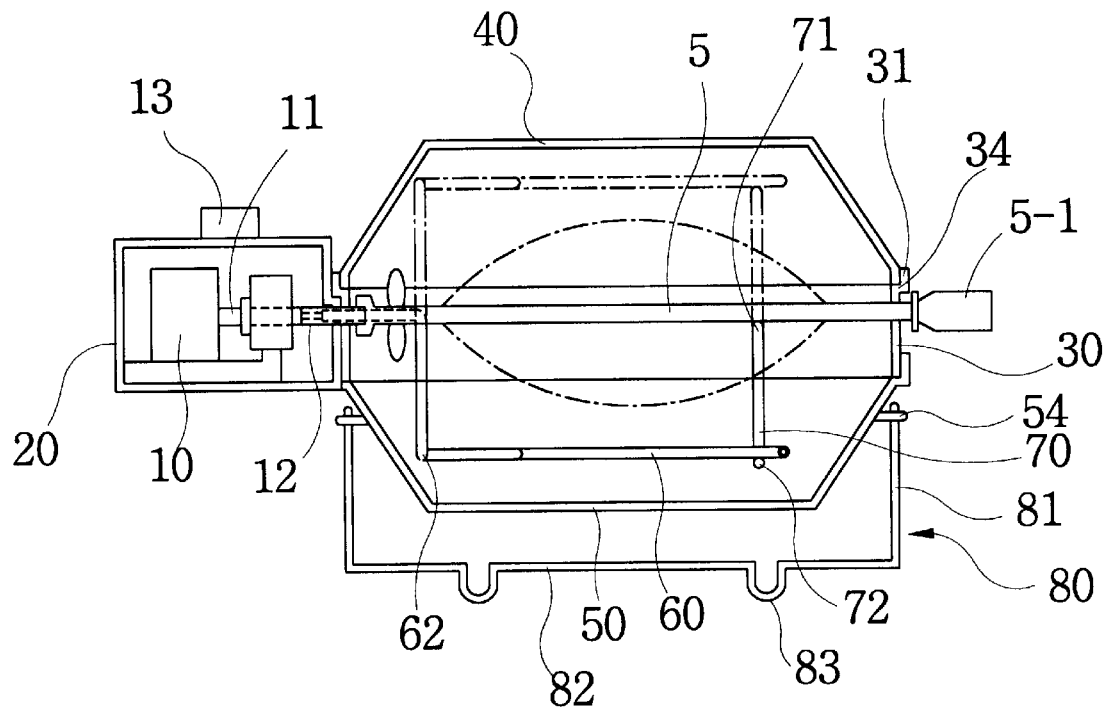
FIG. 4 is a cross-sectional view taken along the line A—A of FIG. 3, illustrating a state wherein the upper oven element is coupled to the oven roaster.

FIG. 4 is a cross-sectional view taken along the line A—A of FIG. 3, illustrating a state wherein the upper oven element is coupled to the oven roaster. The intermediate supporting member 30 is detachably and horizontally coupled to the motor housing 20, and the roasting heater 60 and the roasting spit 5 are installed to the intermediate supporting member 30. The roasting heater 60 has a pair of first bent portions 61 which allow the roasting heater 60 to extend perpendicularly toward a bottom surface of the lower oven element 50 and a pair of second bent portions 62 which allow the roasting beater 60 to extend adjacently and parallel to the bottom surface of the lower oven element 50. As described above, the roasting heater 60 is supported by the support bar 70. The support bar 70 has a pair of third bent portions 71 which are formed adjacent to both free ends, respectively, of the support bar 70 in a manner such that both free ends of the support bar 70 are supported by the intermediate supporting member 30 and a pair of fourth bent portions 72 which allow the support bar 70 to extend parallel to the bottom surface of the lower oven element 50 thereby to support the roasting heater 60. As aforementioned above, the drawing reference numeral 12 represents the reduction shaft, 11-2 the fan, and 13 the power control switch section. Each of two pairs of handle portions 54 is affixed to both lengthwise ends of the lower oven element 50, respectively. The lower oven element 50 is supported by a pair of base stands 80 via the two pairs of handle portions 54. In this case, each base stand 80 possesses substantially a U-shaped contour. Each base stand 80 has a pair of upright portions 81 which are formed at both free ends thereof thereby to support the pair of handle portions 54, respectively, and a bottom portion 82 which is horizontally bent from lower ends of the pair of upright portions 81 such that it is parallel to a supporting surface. At this time, a pair of protrusions 83 which are brought into point contact with the supporting surface, are formed in the bottom portion 82 of each base stand 80. As shown in FIG. 4 by a one-dot chain line, the roasting heater 60 according to the present invention can be installed in such a manner that it is rotated by an angle of 180° and thereby adjoins an upper oven element 40. In this case, the support bar 70 is also rotated by an angle of 180° to effectively support the roasting beater 60. A detailed construction of the support bar 70 will be described hereinafter with reference to FIG. 5.

Figure 5:
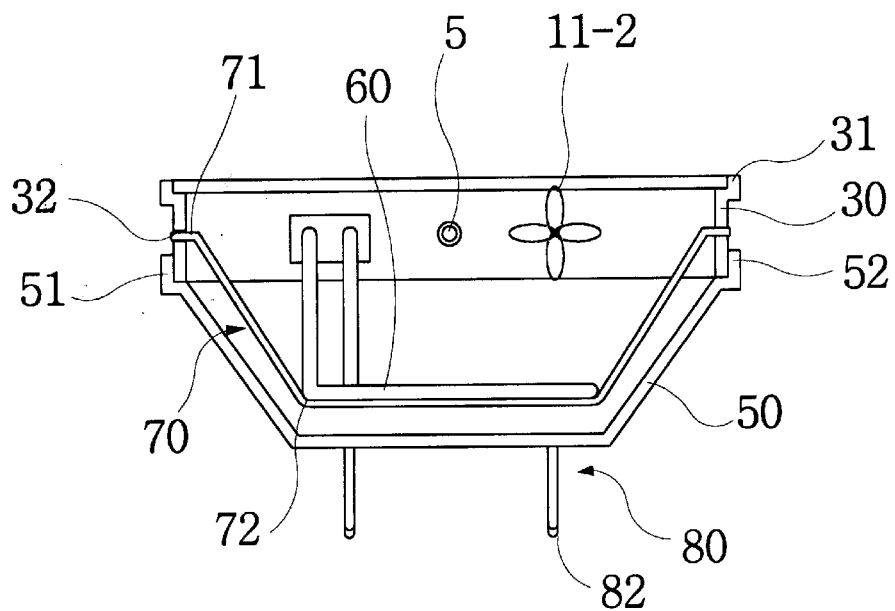
FIG. 5 is a cross-sectional view taken along the line B—B of FIG. 3.

FIG. 5 is a cross-sectional view taken along the line B—B of FIG. 3. As can be readily seen from FIG. 5, the intermediate supporting member 30 is seated onto a first stepped portion of the lower oven element 50. The first stepped portion is formed at an upper end of the lower oven element 50 and represented by the drawing reference numerals 51 and 52. A second stepped portion 31 onto which the upper oven element 40 is seated, is formed at an upper end of the intermediate supporting member 30. The intermediate supporting member 30 has a pair of insertion holes 32, and the support bar 70 is constructed in a manner such that the pair of third bent portions 71 are fitted into the pair of insertion holes 32, respectively. That is to say, as described above, the support bar 70 has the pair of third bent portions 71 which are formed adjacent to both free ends, respectively, of the support bar 70 in a manner such that both free ends of the support bar 70 are fitted into the pair of insertion holes 32, respectively, and supported by the intermediate supporting member 30. The support bar 70 also has the pair of fourth bent portions 72 which allow the support bar 70 to extend parallel to the bottom surface of the lower oven element 50 thereby to support the roasting heater 60. At this time, in FIG. 5, the drawing reference numeral 60 represents the roasting heater, 5 the roasting spit, 11-2 the fan, and 82 the bottom portion of the base stand 80.

Figure 6:
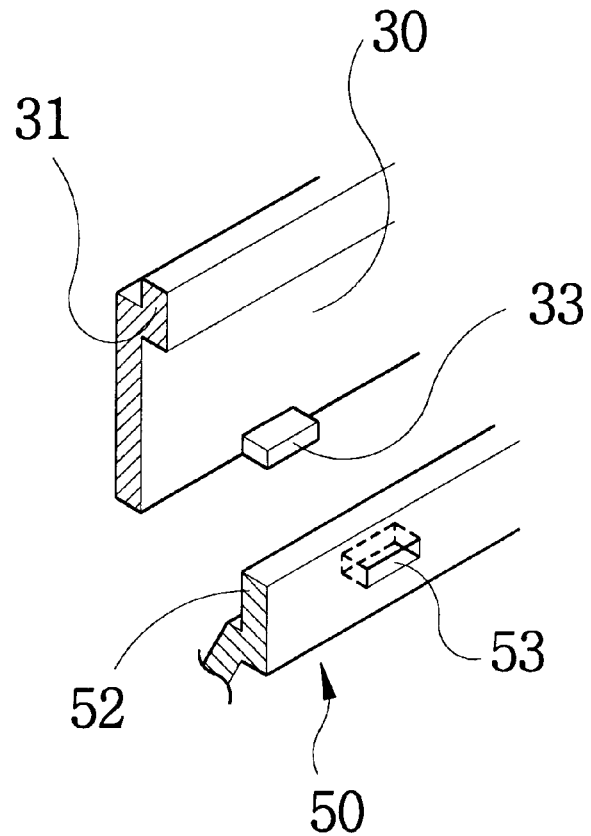
FIG. 6 is a partial exploded perspective view illustrating a way by which a lower oven element and an intermediate supporting member are coupled to each other.
Figure 7:
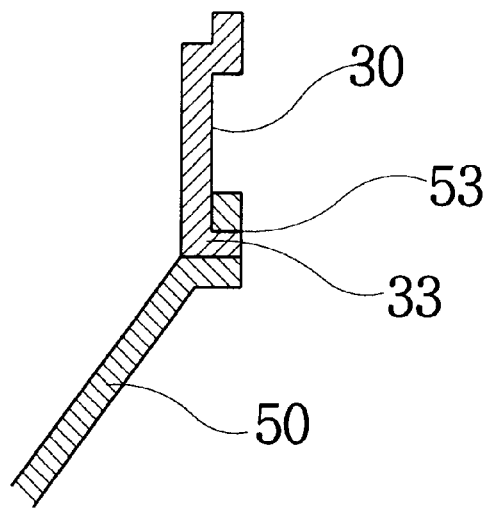
FIG. 7 is a partial enlarged cross-sectional view illustrating another state wherein the lower oven element and the intermediate supporting member are coupled to each other.

FIG. 6 is a partial exploded perspective view illustrating a way by which the lower oven element and the intermediate supporting member are coupled to each other; and FIG. 7 is a partial enlarged cross-sectional view illustrating another state wherein the lower oven element and the intermediate supporting member are coupled to each other. A plurality of side projections 35 are formed on an outer surface and adjacent to a lower end of the intermediate supporting member 30 which has the second stepped portion 31. Also, a plurality of receiving grooves 53 are defined on an inner surface and adjacent to a lower end of the lower oven element 50 having the first stepped portion 52 onto which the intermediate supporting member 30 is seated.

Figure 8:
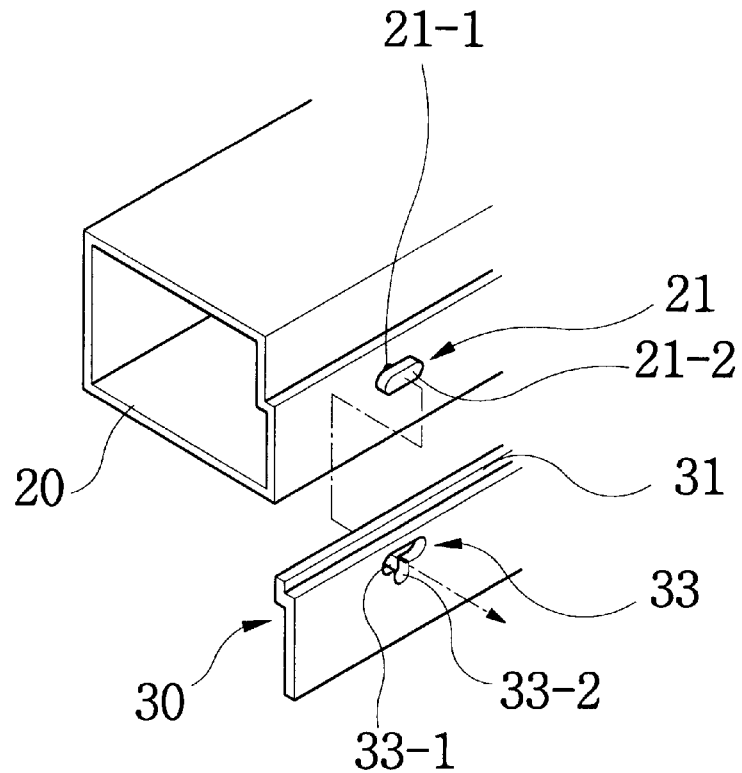
FIG. 8 is a partial exploded perspective view illustrating another way by which a motor housing and the intermediate supporting housing are coupled to each other.

FIG. 8 is a partial exploded perspective view illustrating another way by which the motor housing and the intermediate supporting housing are detachably coupled to each other. The plurality of engaging projections 21 are formed on the motor housing 20, and the plurality of engaging holes 33 are defined in the intermediate supporting member 30. Each engaging projection 21 has a thin neck portion 21-1 and a head portion 21-2 which extends from the neck portion 21-1. A contour of each engaging hole 33 has a head hole portion 33-1 through which the head portion 21-2 of the engaging projection 21 can pass. The contour of each engaging hole 33 further has a neck hole portion 33-2 which is defined at a center part of the head hole portion 33-1 such that it is communicated with the head hole portion 33-1 and into which the neck portion 21-1 of the engaging projection 21 is fitted.

Figure 9:
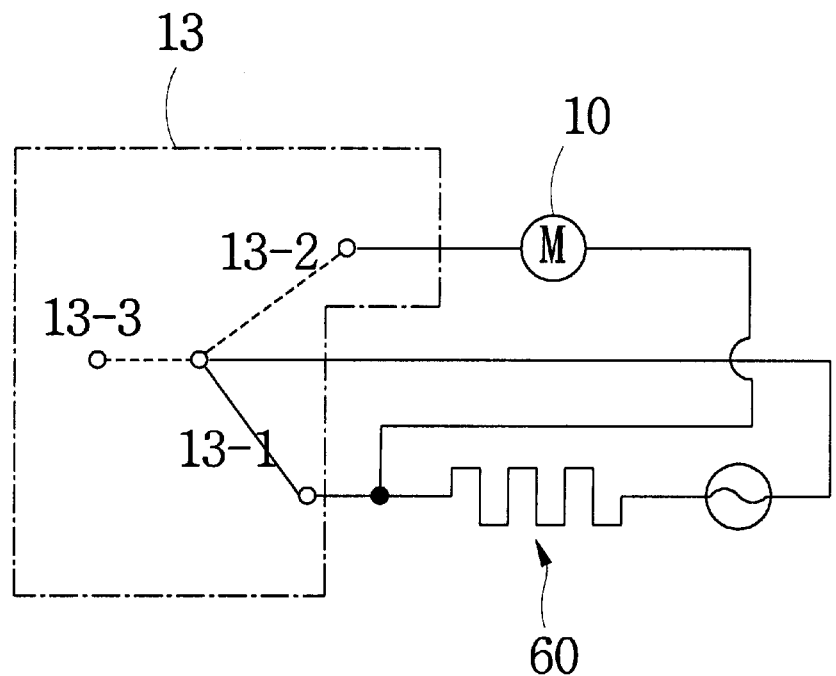
FIG. 9 is a circuit diagram of the disassemblable oven roaster according to the present invention.

FIG. 9 is a circuit diagram of the disassemblable oven roaster according to the present invention. Electric power which is supplied to the oven roaster, is controlled by the power control switch section 13. The power control switch section 13 has a first switch 13-1 for turning on or off only the roasting heater 60, a second switch 13-2 for turning on or off both of the roasting heater 60 and the geared motor 10, and a third switch 13-3 for turning on or off the electric power. Each of the switches 13-1, 13-2 and 13-3 denotes a separate switch or a contact which is solely turned on at any time.

In the disassemblable oven roaster according to the present invention, structured as mentioned above, by passing the head portion 21-2 of each engaging projection 21 through the head hole portion 33-1 of each engaging hole 33 as shown in FIG. 6, the neck portion 21-1 of each engaging projection 21 is fitted into the neck hole portion 33-2 of each engaging hole 33 by virtue of weight of the motor housing 20. This state is shown in FIG. 3. Then, as shown in FIG. 5, the pair of third bent portions 71 of the support bar 70 are fitted into the pair of insertion holes 32 of the intermediate supporting member 30, respectively. Of course, persons skilled in the art will appreciate that, in this case, the roasting heater 60 is already coupled to the intermediate supporting member 30. At this time, because the roasting heater 60 is supported by the pair of fourth bent portions 72 of the support bar 70, the heater 60 can be simply secured without the need for separate fixing means for securing it. The support bar 70 functions to prevent the roasting heater 60 from sagging due to its heating. In the present invention, as shown by the one-dot chain line in FIG, 4, the roasting heater 60 can be installed in such a manner that it is rotated by an angle of 180° and thereby adjoins the upper oven element 40, which is favorable when roasting vegetables, etc. on the upper oven element 40. To this end, it is preferred that the roasting heater 60 is constructed in such a manner that it can be detachably fitted into the intermediate supporting member 30. Consequently, as occasion demands, by altering up and down connecting positions of the pair of connectors for the roasting heater 60, the roasting heater 60 can be easily changed in its position. In this connection, because a structure of the connectors is well known in the art, it is not illustrated in the drawings. Moreover, in this case, persons having ordinary skill in the art will understand that the support bar 70 is also rotated by an angle of 180° to effectively support the roasting heater 60. To this end, the pair of third bent portions 71 are removed from the pair of insertion holes 32, and thereupon, after rotating the support bar 70 by an angle of 180°, the pair of third bent portions 71 are fitted again into the pair of insertion holes 32, respectively. Furthermore, the intermediate supporting member 30 is coupled to the motor housing 20 in a manner such that the main shaft 11 and the reduction shaft 12 project out of the motor housing 20 and into the intermediate supporting member 30, thereby to enable the fan 11-2 to be fastened to the free end of the extended shaft portion 11-1 which is formed by extending the main shaft 11. Additionally, the roasting spit 5 is fastened to the free end of the reduction shaft 12. As described above, the free end of the roasting spit 5 is formed as the knob portion 5-1 which projects out of the intermediate supporting member 30. In this case, the intermediate supporting member 30 is formed with an opening 34 which allows the roasting spit 5 to pass therethrough to be rotatably supported by the intermediate supporting member 30. As an example of forming the opening 34, it is preferred that a part of the second stepped portion 31 is vertically cut out as can be readily seen from FIG. 4.

In addition, in the present invention, by the fact that the plurality of side projections 35 of the intermediate supporting member 30 are fitted into the plurality of receiving grooves 53 of the lower oven element 50, respectively, as shown in FIG. 6, it is possible to prevent the oven roaster from being tilted or turned over, which is otherwise likely to occur due to the fact that its center of gravity is located high. Namely, since the plurality of side projections 35 are securely fitted into the plurality of receiving grooves 53, respectively, thereby to allow the center of gravity of the oven roaster to be located low, even in the case than a user inadvertently touches or pushes a side of the oven roaster, unstable movement of the oven roaster is minimized. By using the oven roaster according to the present invention, constructed as mentioned above, the food material (for example, chicken) to be roasted is secured on the roasting spit 5, as shown by the one-dot chain line in FIG. 4. In this state, if the power control switch section 13 is manipulated to turn on the second switch 13-2 of FIG. 9, the roasting spit 5 is rotated in a manner such that it is interlocked with the reduction shaft 12 of the geared motor 10, and the roasting heater 60 is heated. At this time, because the fan 11-2 is actuated, force for flowing air along a certain direction in a space defined inside the upper and lower oven elements 40 and 50 is created. Thus, heating of the inside air by the roasting heater 60 is speeded up, and roasting of the meat is quickened, whereby economic factors are enhanced. Due to the fact that the roasting heater 60 according to the present invention has, as shown in FIGS. 3 and 4, the pair of first bent portions 61 and the pair of second bent portions 62 depending upon a shape of the lower oven element 50 thereby to adjoin the bottom surface of the lower oven element 50, the space in which the meat spitted by the roasting spit 5 can be rotated, is secured. While not explained in the above descriptions, when the oven roaster according to the present invention is used, upper ends of the pair of upright portions 81 of each base stand 80 are fitted into each pair of handle portions 54 of the lower oven element 50, whereby the supporting surface is protected from the heat of the roaster oven and heating efficiency of the roaster oven is maximized.

As described above, the oven roaster according to the present invention provides advantages in that, since upper and lower oven elements are coupled to an intermediate supporting member such that they can be disassembled from the intermediate supporting member, it is possible to ensure easy washing and storage of the oven roaster. In the present invention, a motor housing is detachably coupled to the intermediate supporting member thereby to receive output of a geared motor, and the geared motor which is mounted to the motor housing, has a main shaft which is specifically shaped to have an extended length, with a fan fastened to a free end of the main shaft thereby to create rotary flow of air in a space inside the oven roaster. Hence, heating efficiency of the oven roaster is maximized and food material is quickly roasted, whereby user preference can be elevated and sales promotion can be more reliably assured.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disassemblable oven roaster comprising:
    a geared motor having a main shaft to a free end of which a fan is mounted and a reduction shaft to a free end of which a roasting spit is connected;
    a motor housing for accommodating the geared motor;
    an intermediate supporting member detachably and horizontally coupled to the motor housing for supporting a roasting heater and the roasting spit which are disposed therein in a manner such that they are spaced apart from each other by a predetermined distance, the intermediate supporting member having opened upper and lower ends; and
    upper and lower oven elements covering the opened upper and lower ends, respectively, of the intermediate supporting member, the upper and lower oven elements being configured so that they can be separated from the intermediate supporting member.

2. The disassemblable oven roaster as claimed in claim 1, wherein the roasting heater has a pair of first bent portions which allow the roasting heater to extend perpendicularly to a bottom surface of the lower oven element and a pair of second bent portions which allow the roasting heater to extend adjacently and parallel to the bottom surface of the lower oven element.

3. The disassemblable oven roaster as claimed in claim 1, wherein the roasting heater is supported by a support bar; and the support bar has a pair of third bent portions which are formed adjacent to both free ends, respectively, of the support bar in a manner such that both free ends of the support bar are supported by the intermediate supporting member and a pair of fourth bent portions which allow the support bar to extend parallel to the bottom surface of the lower over element thereby to support the roasting heater.

* * * * *